US005190224A

United States Patent [19]

Hamilton

[11] Patent Number: 5,190,224

[45] Date of Patent: Mar. 2, 1993

[54] QUICK DISCONNECT NOZZLE ASSEMBLY

[75] Inventor: Richard J. Hamilton, West Chicago, Ill.

[73] Assignee: Spraying Systems Co., Wheaton, Ill.

[21] Appl. No.: 835,045

[22] Filed: Feb. 11, 1992

Related U.S. Application Data

[63] Continuation of Ser. No. 505,068, Apr. 5, 1990, abandoned.

[51] Int. Cl.[5] .......... B05B 1/00; F16L 37/18; F16L 19/00

[52] U.S. Cl. .......... 239/600; 285/314; 285/376; 285/910

[58] Field of Search .......... 239/600; 285/259, 330, 285/314, 376, 910

[56] References Cited

U.S. PATENT DOCUMENTS

| | | | |
|---|---|---|---|
| 744,646 | 11/1903 | Tietz | 285/376 |
| 943,900 | 12/1909 | Smith | 285/376 |
| 1,033,187 | 7/1912 | Metzger | 285/376 |
| 1,516,396 | 11/1924 | Mueller et al. | 285/910 |
| 3,840,257 | 10/1974 | Moore | 285/910 |
| 4,185,781 | 1/1980 | O'Brien . | |
| 4,349,884 | 9/1982 | Haruch et al. . | |
| 4,438,884 | 3/1984 | O'Brien et al. . | |
| 4,527,745 | 7/1985 | Butterfield et al. . | |
| 4,591,099 | 3/1986 | Emory et al. . | |
| 4,738,401 | 4/1988 | Filicicchia . | |
| 4,815,665 | 3/1989 | Haruch . | |
| 4,828,182 | 5/1989 | Haruch . | |

*Primary Examiner*—Andres Kashnikow
*Assistant Examiner*—Christopher G. Trainor
*Attorney, Agent, or Firm*—Leydig, Voit & Mayer

[57] ABSTRACT

A quick disconnect nozzle assembly comprising a nozzle body, a spray tip, and an annular sealing member interposed therebetween. The nozzle body and spray tip have inclined seal engaging surfaces that compress the annular sealing member at three distinct points for exerting both axial and radial pressures thereon, and the body and spray tip have cams and separate radial detents for smoothly drawing the tip and body together into sealing engagement with the annular sealing member in repsonse to tip rotation and without the necessity for overcompressing the sealing member. A secondary, external sealing member is provided, which together with the internal sealing member, seal the cams and detents in an internal chamber area isolated from the liquid sprayed by the nozzle.

39 Claims, 3 Drawing Sheets

QUICK DISCONNECT NOZZLE ASSEMBLY

This is a continuation of copending application Ser. No. 07/505,068 filed on Apr. 5, 1990 now abandoned.

FIELD OF THE INVENTION

The present invention relates generally to spray nozzles, and more particularly, to spray nozzle assemblies of the type which have quick disconnect means for permitting disassembly of the nozzle for replacement of the nozzle tip or for cleaning.

BACKGROUND OF THE INVENTION

Spray nozzles are used in a multitude of industrial, agricultural, and commercial applications in which it is frequently necessary to remove the spray tip for various reasons, such as inspection and cleaning, replacement of a worn spray tip, or substitution of the spray tip in order to change the spray pattern. It is desirable, therefore, that such nozzle assemblies permit quick and easy tip removal, while ensuring precise tip orientation and sealing characteristics upon replacement. It further is desirable, particulary for many industrial applications, that such nozzle assemblies be as small as possible with maximized strength for high pressure spraying. Various quick disconnect nozzles heretofore have been proposed and manufactured, but many of these nozzles have had sealing problems, or have made replacement of the spray tips relatively difficult or tiresome, or have required precision machining or molding tolerances, or have had bulky or complex designs.

The following prior patents, all of which are assigned to the same assignee as the present application, have been directed to such problems. U.S. Pat. No. 4,185,781, for example, discloses a quick disconnect nozzle wherein a separate "O" ring sealing member and a separate pressure applying spring are utilized. Radial sealing forces are exerted on the "O" ring by virtue of its interposed mounting between outer periphery of the nozzle tip and an inner peripheral wall of the nozzle body. The spring biases the nozzle tip toward its operative position U.S. Pat. No. 4,438,884 discloses a quick disconnect nozzle incorporating a tubular shaped combination seal and pressure exerting member, which eliminates the need for a separate biasing spring. With the elongated sealing member interposed between the end of the spray tip and an internal shoulder of the body, the sealing forces in this instance are axially directed. The nozzle designs of both of the foregoing patents are of the push and turn type, which necessitate manual forcing of the spray tip against the biasing force of the spring or elongated sealing member and then twisting of the nozzle tip into assembled and locked position. While such nozzles must have sufficient length to accommodate the axial spring or tubular sealing member, both designs have lent themselves well to manufacture by traditional machining methods.

U.S. Pat. No. 4,527,745 discloses a quick disconnect nozzle assembly, which has particular applicability for agricultural uses, and which has camming surfaces adapted for drawing the mating nozzle tip and body parts together against an interposed sealing member in response to rotation of the nozzle tip, without the necessity for simultaneous manual axial forcing of the tip against the sealing member. This design uses a short-length, flat sealing gasket and camming lugs which cooperate with camming and locking slots in a tip carrying cap of the nozzle assembly. U.S. Pat. No. 4,738,401 similarly features camming surfaces to draw the nozzle tip and body together while compressing a tubular configured sealing member with only rotational forces being applied to the tip.

The cam operated designs of both of the foregoing patents utilize a detent action for locating the tip in its fully rotated and finally assembled position. In achieving such detent action, the sealing member must be overcompressed, by virtue of the tip being advanced into the nozzle a greater amount than required for effecting the desired sealing pressure, before the lugs can snap into the detents. Disasembly of the nozzle tip similarly requires overcompression of the sealing member in moving the camming lugs to a position that clear the detents, prior to rotating the nozzle tip in a reverse disengaging direction. Since the axial forces against the sealing member are achieved through rotation of the tip, effecting the overcompression requires greater exertion by the installer. The locking and camming lugs also must have sufficient strength to accommodate the transmission of such greater forces. Because of the complexity of the internal camming surfaces, the designs of both of the foregoing patents have been particularly suited for manufacture by high volume plastic molding techniques.

Quick disconnect nozzles have been found to be particularly problem prone when spraying liquids that contain a high percentage of solids. After prolonged usage, even limited evaporation of the liquid may leave a layer of dried solids that coat exposed surfaces and recesses of the nozzle parts. This coating can interfere with removal of the tip if it is deposited on mating cam surfaces or on surfaces with close tolerances which must be moved relative to each other during disassembly. In quick disconnect nozzles that require the nozzle tip to be forced into the nozzle body to overcompress the seal to a detent disengaging position prior to disassembly, this movement of the tip against the seal and out of the detents during disassembly often also necessitates compressing the deposits within the nozzle. When heavy deposits occur, disassembly of the tip by hand may be significantly impeded or prevented. In addition, after removal of the nozzle tip from the nozzle assembly, it frequently is desirable to direct pressurized fluid through the nozzle body in order to clean and flush out any contaminants that have accumulated. With the spray tip removed, however, such flushing with pressurized liquid can cause the sealing members to become dislodged and be forcefully ejected from the nozzle body, making it necessary to locate the sealing members and then replace them.

OBJECT AND SUMMARY OF THE INVENTION

It is an object of the present invention to provide a quick disconnect nozzle assembly which permits easier removal and replacement of the spray tip.

Another object is to provide a spray nozzle assembly as characterized above which permits the spray tip to be both assembled and disassembled from the nozzle body with a simple twisting action and without the necessity for overcompressing the sealing member by exerting forces on the sealing member beyond that necessary for achieving the desired seal.

A further object is to provide a spray nozzle assembly of the foregoing type in which rotation and locking of the nozzle tip is accomplished with a lighter, easier feel than prior disconnect nozzle assemblies.

Yet another object is to provide a quick disconnect nozzle of the above kind which may be used for spraying liquids with high solids contents for prolonged periods and which may incur solids build up on exposed surfaces, without interfering with disassembly and replacement of the nozzle tip. A related object is to provide such a spray nozzle assembly in which cooperating camming and locking means are maintained in a chamber effectively sealed from the liquids being sprayed by the nozzle.

Another object is to provide a quick disconnect nozzle of such type which may be flushed following removal of the tip without unwanted dislodging or discharge of the sealing member.

Still another object is to provide a quick disconnect nozzle of the above kind which has improved strength while maintaining a minimum size for the nozzle assembly.

Another object is to provide such a quick disconnect nozzle which utilizes common, relatively small, "O" ring sealing members and which is particularly suited for economical manufacture by high volume plastic molding techniques.

Other objects and advantages of the invention will become apparent upon reading the following detailed description and upon reference to the drawings, in which:

Figure 1:
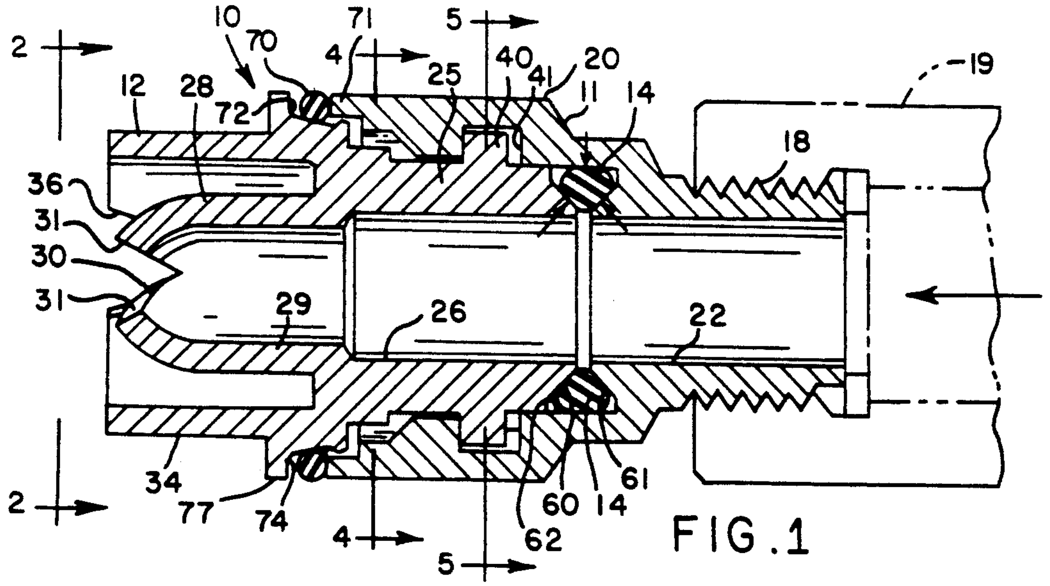
FIG. 1 is a longitudinal vertical section of a quick disconnect nozzle assembly embodying the present invention.
Figure 2:
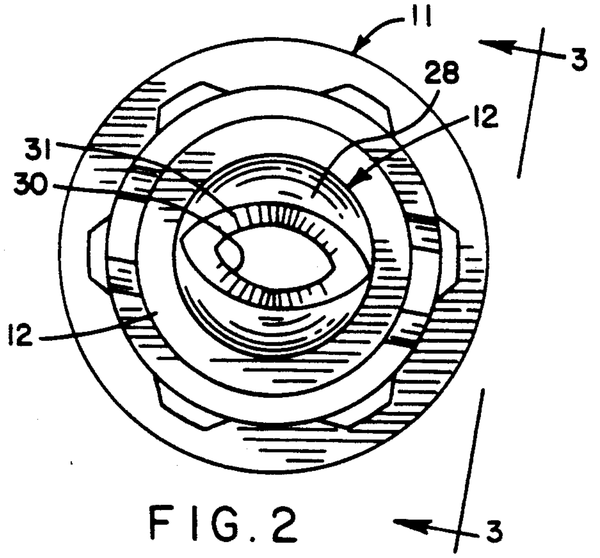
FIG. 2 is an enlarged front end view of the illustrated nozzle assembly, taken in the plane of line 2—2 in FIG. 1.
Figure 3:
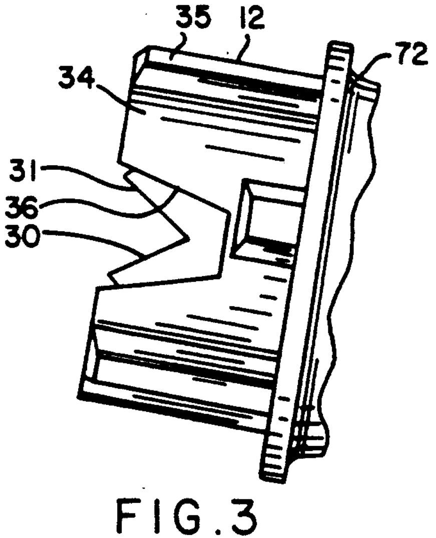
FIG. 3 is a fragmentary side view of the nozzle assembly, taken in the plane of line 3—3 in FIG. 2.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DESCRIPTION OF THE PREFERRED EMBODIMENT

Turning now more particularly to the drawings, there is shown an illustrated quick disconnect nozzle assembly 10 embodying the present invention. The nozzle assembly 10 basically includes a nozzle body 11, a spray nozzle tip 12, and a combination seal and pressure exerting member 14 interposed therebetween. The nozzle body 11 and tip 12 both preferably are formed of a suitable chemically resistant plastic material that may be produced by injection molding in high capacity production equipment. The nozzle body 11 in this instance has an upstream end portion formed with external threads 18 for connecting the nozzle body 11 to a suitable conduit 19 from the source of spray fluid and a hexagonal forward portion 20 that enables a wrench to be applied to the body 11 to tighten the connection, as required. The interior of the nozzle body 11 has a fluid passageway defined by an internal bore 22 and an enlarged annular chamber 24 downstream thereof for receiving the combination seal and pressure exerting member 14 and an upstream end portion 25 of the spray nozzle tip 12.

The upstream end portion 25 of the spray tip 12 is formed with an internal fluid passageway bore 26 sized similarly to the internal fluid passageway bore 22 of the body 11. The spray tip 12 further includes a forward conduit portion 28 that defines a slightly reduced diameter bore 29 which communicates with the bore 26 and terminates in an forward curved or concave end formed with a spray orifice 30. The spray orifice 30 in this instance is defined by a transversely directed "V"-shaped cut in the forward curved end of the conduit portion 28 so as to form a generally elongated outlet with diverging sides 31 for producing a diverging spray pattern.

To facilitate gripping and turning of the nozzle tip 12, the tip has an outer, cylindrical shell 34 extending in surrounding outwardly spaced relation to the conduit portion 28. The shell 34 preferably is formed with a plurality of longitudinally extending ribs 35, which may be conveniently gripped between the installer's fingers and thumb. The shell 34 in this case is formed with generally "V"-shaped cutouts 36 adjacent opposite sides of the transverse discharge orifice 30 so as not to interfere with the discharging spray pattern.

In accordance with the invention, the nozzle tip and body are formed with cooperating camming and detent means which are separate and apart from each other for causing the nozzle tip and body to be drawn together and positively retained in predetermined assembled relation and to be disengaged therefrom in response to rotational movement of the nozzle tip, without the necessity for overcompressing the interposed sealing member by exerting forces thereon beyond that necessary for achieving the desired seal. To this end, in the illustrated embodiment, the upstream end 25 of the nozzle tip 12 is formed with a pair of outwardly-extending, diametrically-opposed radial camming lugs 40 that are adapted for cooperative engagement with respective diametrically opposed camming slots 41 integrally formed within the chamber 24 of the nozzle body 11.

Figure 5:
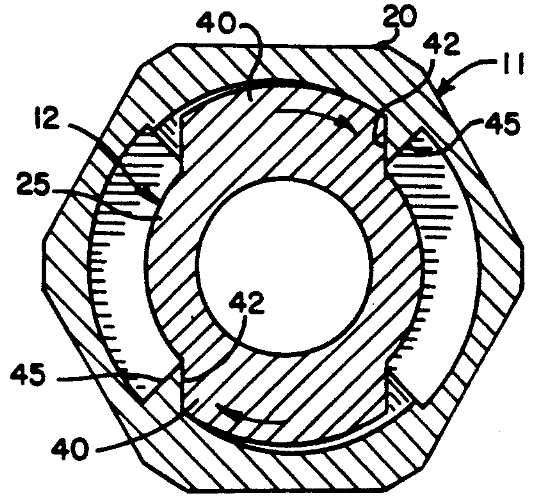
Figure 6:
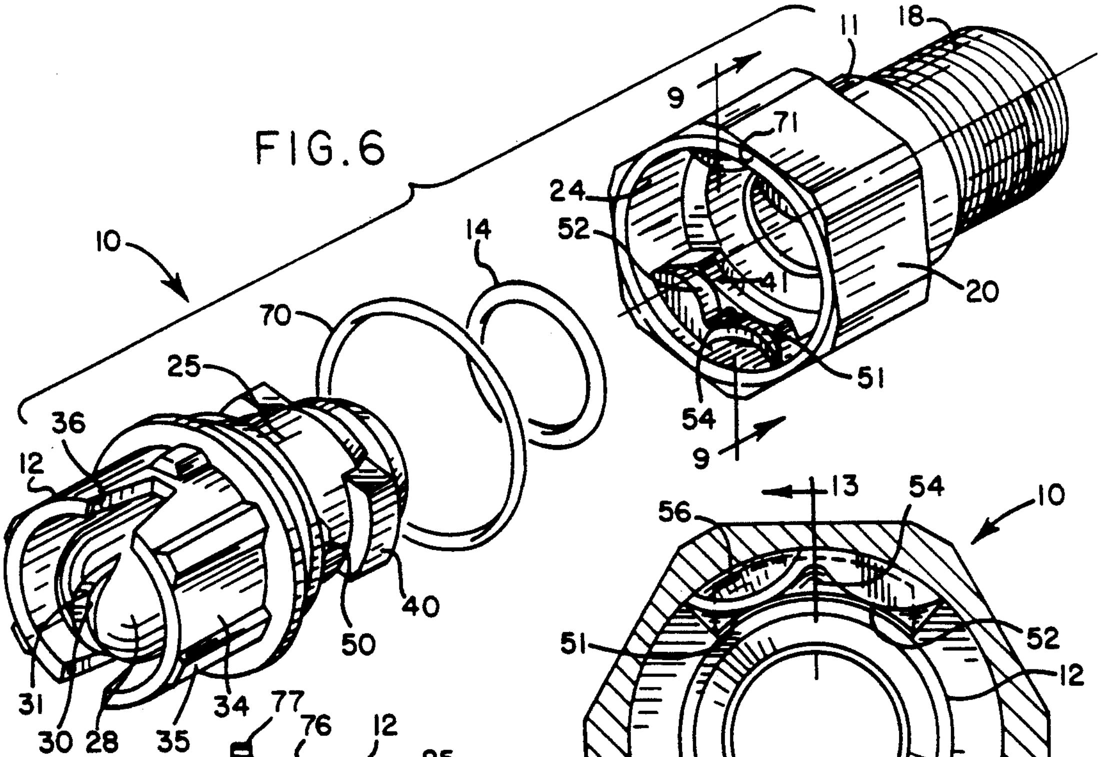
FIG. 6 is an exploded view of the illustrated nozzle assembly.
Figure 7:
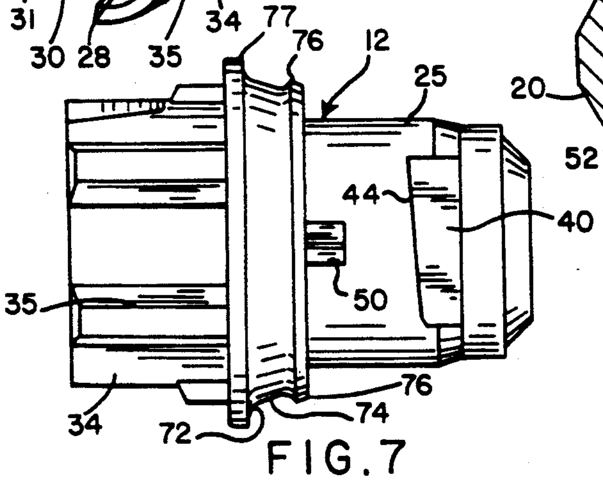
FIG. 7 is a side plan view of the nozzle tip of the illustrated nozzle assembly.
Figure 9:
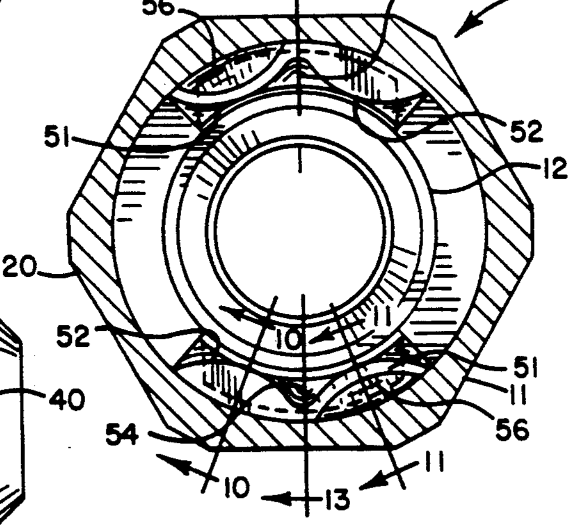
FIG. 9 is an enlarged vertical section of the nozzle body of the illustrated assembly, taken in the plane of line 9—9 in FIG. 6.
Figure 8:
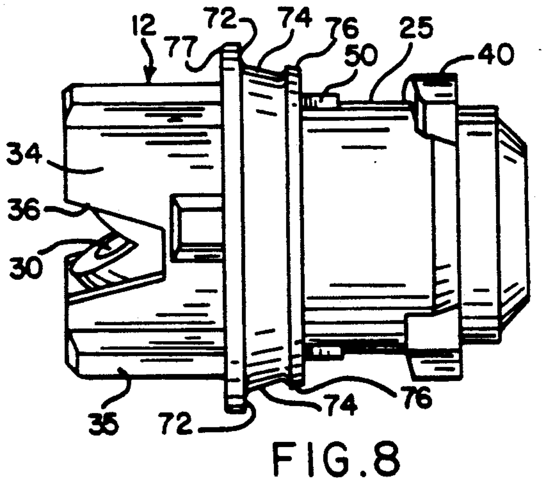
FIG. 8 is a top plan view of the nozzle tip.
Figure 10:
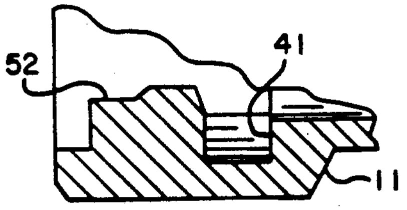
FIGS. 10 and 11 are enlarged fragmentary sections of the nozzle body taken in the planes of lines 10—10 and 11—11, respectively, in FIG. 9.
Figure 11:
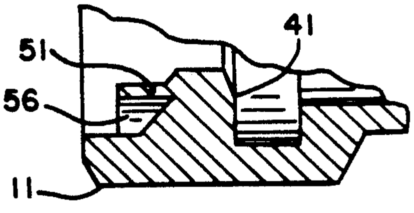

When the upstream end portion 25 of the tip 12 is positioned into the body chamber 24, the lugs 40 are positionable adjacent access openings to the respective diametrically opposed camming slots 41. With the tip 12 so positioned, rotational movement of the tip in the clockwise direction, as viewed in FIG. 5, causes the camming lugs 40 to be moved into the respective slots 41 and proceed until the lugs 40 abut end walls 42 of the slots 41, which establishes the final rotated position of the tip (FIG. 5). During such rotational movement of the tip 12, the tip is cammed inwardly into the body 11 by inclined camming ramps 44 formed on side walls of the lugs 40 (FIG. 7). The nozzle tip 12 is drawn smoothly and gradually into the nozzle body 11 and into sealing engagement with the interposed sealing member 14, without the necessity for forcing the camming lugs 40 over detents and without the necessity for overcompressing the sealing member 14 during the course of rotational movement of the tip to its finally assembled position. The end walls 42 of the camming slots 41 establish the predetermined assembled position of the tip 12 within the body 11, which in turn sets the orientation of the discharge orifice 30 and the spray pattern. The end walls 42 further define stop surfaces 45 (FIG. 5) which block counterclockwise rotational movement of the tip during assembly and which limit counterclockwise rotary movement of the tip 12 to a predetermined location for permitting axial withdrawal of the tip from the nozzle body during disassembly.

In carrying out the invention, the spray tip and body are formed with cooperating detent means which are engageable for positively retaining the tip in assembled position without the necessity for overcompressing the interposed sealing member during tip assembly and disassembly. More particularly, the upstream end of the nozzle tip is provided with a pair of diametrically opposed radial detents in forwardly spaced relation to the camming slots that are adapted for cooperation with respective radial detent receiving means integrally formed within the chamber of the nozzle body. The spray tip detents in the illustrated embodiment are in the form of lugs 50 having a rounded configuration and extending outwardly a relatively small distance from the outer cylindrical periphery of the spray tip end portion 25. The radial detent receiving means in this instance each comprise pairs of inwardly directed arcuate surfaces 51, 52 integrally formed within the body chamber 24, which define locating and retaining grooves 54 for the respective spray tip detents 50. The arcuate detent surfaces 51, 52 preferably are in longitudinal alignment with the cam lug receiving slots 41 in the body chamber 24 and the camming lugs 40 are dimensioned for insertion into and removal from the body chamber 24 in circumferentially offset relation to the arcuate detent surfaces 51, 52 and camming slots 41, thus requiring that the nozzle tip 12 be inserted into the chamber 24 of the body in one or the other of two angular positions 180° apart.

Figure 4:
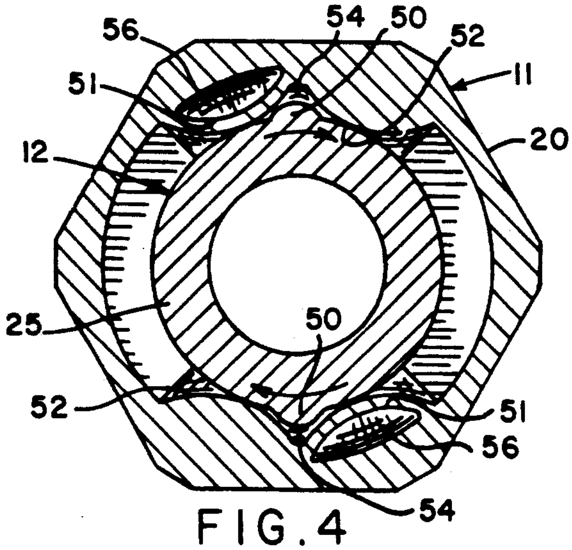
FIGS. 4 and 5 are enlarged sections of the nozzle assembly taken in the planes of FIGS. 4—4 and 5—5 in FIG. 1, respectively.
Figure 12:
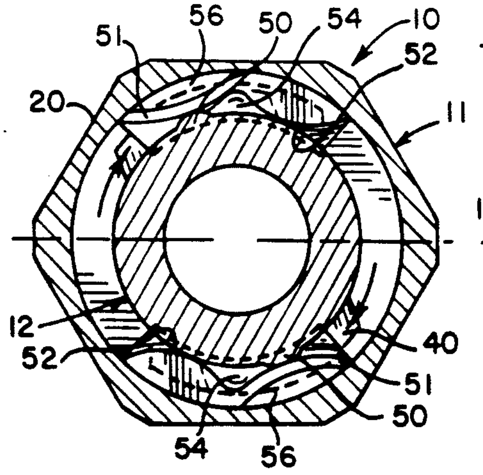
FIG. 12 is a transverse vertical section of the illustrated nozzle assembly.
Figure 13:
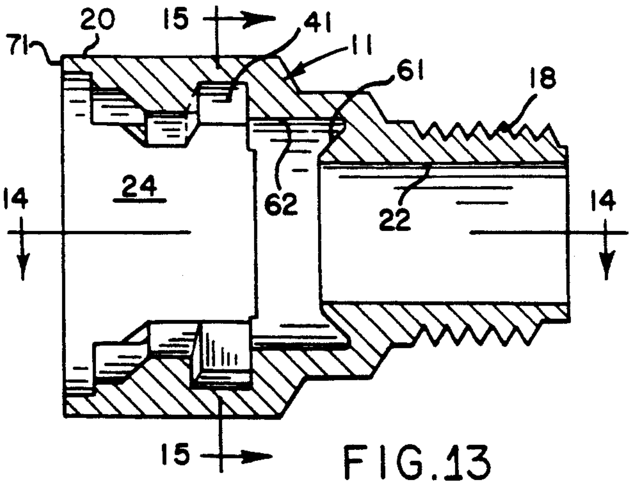
FIG. 13 is a vertical section of the nozzle body taken in the plane of line 13—13 in FIG. 9.

The arcuate detent surfaces 51, 52 preferably are sized for supporting the cylindrical periphery of the spray tip portion 25 concentrically within the body 11, and hence, extend inwardly beyond the outer periphery of the detents lugs 50. One of the arcuate surfaces 51 for each pair is formed by a relatively thin, curved wall extending inwardly into the body chamber 24 which defines a hollow area or space 56 outwardly thereof and which has sufficient flexibility for permitting the passage of the spray tip detents 50 with relative ease during their clockwise movement in a tip assembling direction, as depicted in FIG. 12. The other arcuate surface 52 is defined by a solid portion of the body chamber wall which resists and prevents rotational movement of the spray tip detent 51, 52 beyond the desired assembled position established by the detent receiving grooves 56 (FIG. 4) and abutment of the camming lugs 40 against the end walls of the camming slots. Likewise, the thin walled arcuate surfaces 51 permit counterclockwise passage of the spray tip detents 50 from the assembled position, shown in FIG. 4, during disassembly of the tip from the body.

During assembly and disassembly of the nozzle tip 12, passage of the detent lugs 50 over the flexible arcuate surfaces 51 provides a distinct, tactile feedback to the installer. The detent forces, however, act in a radial direction and are not a function of the pressure exerted on the sealing member 14. Thus, it is unnecessary for the installer to overcompress the sealing member, either by manually forcing the tip against the sealing member or by exerting additional and unnecessary twisting torque on the tip. Instead, assembly and disassembly of the tip is effected through simple tip rotation, which is accomplished with lighter, easier feel than prior disconnect nozzle assemblies. This is a highly advantageous feature in field conditions where the installer may be required to remove large numbers of tips in order to change, replace, or clean the tips.

Figure 14:
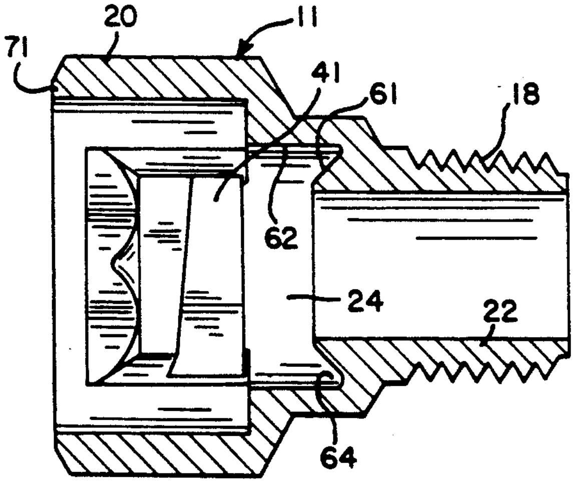
FIG. 14 is a horizontal section of the nozzle body, taken in the plane of line 14—14 in FIG. 13.
Figure 15:
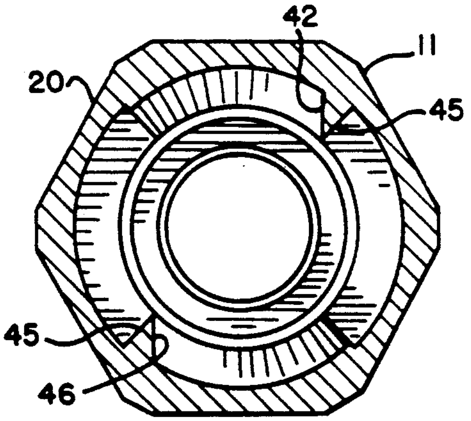
FIG. 15 is a transverse vertical section of the nozzle body, taken in the plane of line 15—15 in FIG. 13.

In accordance with a further important aspect of the invention, the nozzle tip and body exert compressive or squeezing forces on the interposed sealing member in both radial and axial directions for achieving reliable sealing with a relatively small sealing member and minimum forces, and without critical tolerances either in sizing or movement of the tip and body. To this end, the sealing member 14 is a simple, relatively small diameter "O" ring and the upstream end portion of the nozzle tip 12 and the body 11 are formed with oppositely inclined sealing member engaging faces 60, 61 which cooperate to secure the sealing member 14 against a cylindrical wall 62 of the body chamber 24, thereby compressively engaging the "O" ring 14 at three distinct circumferentially-spaced locations about its periphery, as indicated in FIG. 1. The sealing ring 14 preferably is slightly larger than the cylindrical wall 62 of the body chamber 24 such that the ring is maintained in slightly radially compressed condition. The inclined face 60 of the nozzle tip in this case is defined by a conical upstream end of the tip end portion 25, and the inclined face 61 of the body 11 is defined by a rearwardly and outwardly extending angled groove 64 (FIG. 14) in the body which partially receives the "O" ring. As the tip 12 is drawn into the nozzle body 11 during assembly upon rotation of the tip, as described above, it can be seen that the "O" ring sealing member 14 tends to be forced into the groove 64 as it is squeezed at three circumferentially spaced locations by the inclined face 60 of the tip 12, the inclined face 61 of the body 11, and the circumferential wall 62 of the body chamber 24.

Such three point compression of the sealing member 14 has been found to have several important advantages. At the outside, it minimizes the length of the nozzle assembly by virtue of the compact cross section of the "O" ring sealing member. This in turn allows the cross sections of the camming lugs 40 and the cam receiving slots 41 to be maximized for increased strength, without significant increase in the size of the nozzle. With the "O" ring 14 compactly trapped between the three seal engaging surfaces 60, 61, 62 in closely adjacent relation to the fluid passageway defined by the bores 22, 26, internal forces exerted on the tip 12 and body 11 by the pressurized fluid in the nozzle is minimized. Perhaps most importantly, since the three point seal compression squeezes the "O" ring in both radial and axial directions, smaller axial force is required to compress the sealing ring into reliable sealing engagement between the tip and body member, and hence, reduced effort is needed in rotating the tip into and out of engagement with the body.

Moreover, tolerancing in sizing and movement of the mating tip 12 and body 11 are far less critical with the three point compression of the sealing member 14 of the present invention, as compared to squeezing the seal in an axial direction between two parallel faces. Because angle faces 60, 61 of the tip and body 12, 11 are in contact with the "O" ring 14, only a component of the axial movement is used to compress the sealing member 14, which in turn allows a greater stroke to be built into the movement of the tip 12 relative to the body 11 during assembly without requiring excessive squeezing forces. Likewise, since only a component of the forces exerted on the face of the tip 12 in contact with the "O" ring 14 is transmitted as an axial force against the camming surfaces 40, 41 as the tip is rotated into locked position, as indicated above, this translates into a lower torque needed to assemble the tip and body. While in the illustrated embodiment, the inclined faces 60, 61 of the tip and body 12, 11 are disposed at angles of about 45° to the axis of the nozzle, alternatively, effective three point squeezing of the "O" ring 14 may be achieved with the faces 60, 61 inclined at angles of between 15° and 75° with respect to the longitudinal axis of the nozzle.

In carrying out a further aspect of the invention, secondary sealing means is provided which together with the sealing member 14 effectively seals the camming lugs 40 and detents 50 in a chamber free of contamination from the liquids being sprayed, as well as from the surrounding environment. For this purpose, secondary sealing means in the form of an "O" ring 70 is provided at the outer juncture of the tip 12 and body 11. The body 11 in this instance has a forwardly extending annular sealing end 71 positioned in closely adjacent, partially-overlapping relation to an outer peripheral shoulder 72 of the nozzle tip 12 located intermediate to the ends of the tip. For maintaining the external "O" ring 70 in its sealed position against the annular sealing end 71 of the body 11, the shoulder 72 is formed with a forwardly and outwardly tapered ramp 74 upon which the "O" ring is mounted. The "O" ring 70 is sized smaller than the ramp 74 such that it must be positioned thereon in a stretched condition at the bottom of the ramp 74 in seating relation against an outwardly extending radial lip 76 that retains the "O" ring 70 on the ramp. As the tip 12 is advanced into an assembled position, the sealing end 71 of the body 11 contacts the "O" ring 70 and forcefully pushes it up the ramp 74 as the tip 12 is cammed into the body 11. As a result, the increased stretching forces of the "O" ring will cause it to resist movement up the ramp 74 and create a tight seal between the ramp 74 and the sealing end 71 of the body 11.

With the nozzle tip 12 in its assembled position within the body 11, it can be seen that the "O" ring seals 14, 70 effectively seal the camming lugs 40 and detents 50 within a chamber defined between the upstream end portion 25 of the tip 12 and the forward portion 20 of the nozzle body 11. As a consequence, the nozzle assembly 10 may be used for spraying liquids that contain even relatively high percentages of solids without significantly interfering with the assembly and disassembly of the tip. Even if a coating of dried solids accumulates on surfaces of the nozzle that are exposed to the liquid, since during disassembly the tip moves directly away from both the internal and external "O" ring seals 70, 14 no compression of deposited solids will occur.

Figure 16:
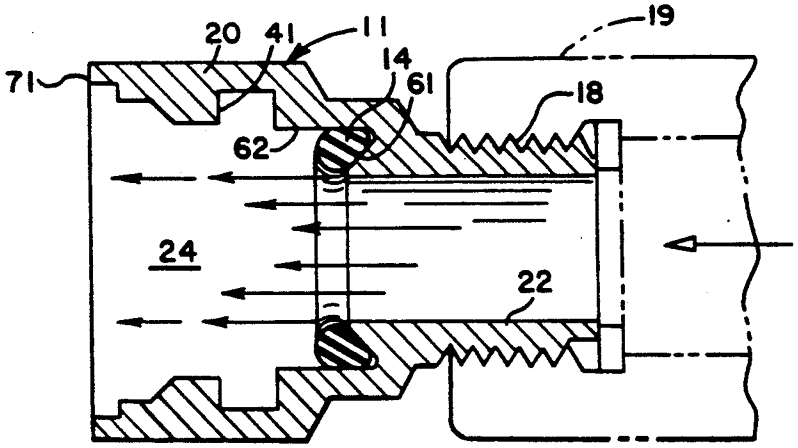
FIG. 16 is a transverse section of the nozzle assembly with the spray tip removed and showing the nozzle body being flushed and cleaned with liquid directed through the nozzle body.

The nozzle tip and body, furthermore, are susceptible to easy cleaning without removal or loss of the sealing members 14, 70. Upon disassembly of the tip 12, the external "O" ring 70 is urged downwardly into seating relation against the outwardly extending radial lip 76 at the bottom of the ramp 74 that retains the "O" ring 70 on the ramp. The ramp 74 in this instance also has a radial lip 77 at its upper end for preventing accidental dislodging of the "O" ring during handling. Since the internal "O" ring 14 is oversized and snugly disposed within the outwardly and rearwardly extending groove 64 in the nozzle body 11, it is effectively protected from fluid flow that might be directed in a downstream direction through the nozzle body, such as during flushing or cleaning (FIG. 16).

From the foregoing, it can be seen that the quick disconnect nozzle assembly of the present invention is adapted for easy removal and replacement of the spray tip with simple twisting action and without the necessity for overcompressing the interposed sealing member by exerting forces on the sealing members beyond that necessary for achieving the desired seal. The radial detent arrangement and the internal three point seal compression permit the nozzle tip to be assembled and disassembled from the body with a lighter, easier feel than prior disconnect nozzle assemblies. Furthermore, the nozzle may be economically manufactured with relatively small size and maximized strength, and may be used for high pressure spraying of even high solids containing liquids without interfering with the assembly and replacement of the nozzle tip. It will be understood that while a unitary plastic injection molded nozzle tip has been shown in the illustrated embodiment, alternatively such a tip member or cap may be used for supporting a separate metallic spray tip insert.

What is claimed is:

1. A quick disconnect nozzle assembly comprising
   a nozzle body,
   a removable and replaceable spray nozzle tip,
   said tip and body each having an internal bore for the passage of liquid therethrough,
   said nozzle tip having a discharge orifice for imparting a predetermined spray pattern to liquid passing through said liquid passage bores and discharging from said tip;
   an annular sealing member interposed between said tip and body,
   said nozzle tip and body having cooperating camming means for causing said tip and body to be axially drawn together in response to rotation of said tip relative to said body for pressing said tip and body into predetermined sealing engagement with said annular sealing member,
   said nozzle tip and body having radially cooperating detent means, said detent means being axially separated from said camming means and being actuatable in response to rotation of said tip relative to said body in one direction for retaining said tip in predetermined sealing engagement with said annular sealing member without affecting the force of engagement of said spray tip and body on said annular sealing member and for locating and retaining said nozzle tip and the discharge orifice thereof in predetermined angular orientation relative to said body, and said detent means being deactuatable in response to rotation of said tip relative to said body in an opposite direction for removing said tip from said body without increasing the force of engagement of said spray tip and body on said annular sealing member.

2. The quick disconnect nozzle assembly of claim 1 in which said detent means include detent lugs on one f said tip and body and pairs of arcuate surfaces on the other of said tip and body, said pairs of arcuate surfaces each defining a detent lug receiving groove for receiving one of said detent lugs.

3. The quick disconnect nozzle assembly of claim 1 in which said camming means includes camming lugs on one of said tip and body and camming lug receiving slots in the other of said tip and body, and said detent means includes detent lugs on one of said tip and body and pairs of arcuate surfaces on the other of said tip and body, said pairs of arcuate surfaces on the other of said tip and body, said pairs of arcuate surfaces each defining a detent lug receiving groove for receiving one of said detent lugs and retaining said tip and body in sealing engagement with said annular sealing member.

4. The quick disconnect nozzle assembly of claim 1 in which said tip and body have seal engaging surfaces for simultaneously compressing said annular sealing member radially and axially in response to rotational movement of said tip relative to said body.

5. The quick disconnect nozzle assembly of claim 4 in which said tip and body fluid passage bores are coaxial and said tip and body each are formed with an inclined sealing member engaging surface disposed at an acute angle to the axis of said bores.

6. The quick disconnect nozzle assembly of claim 5 in which said inclined sealing member engaging surfaces of said tip and body are disposed at an angle of between about 15° and 75° to the axis of said bores.

7. The quick disconnect nozzle assembly of claim 6 in which said sealing member engaging surfaces of said tip and body are disposed at an angle of about 45° to the axis of said bores.

8. The quick disconnect nozzle assembly of claim 6 in which said inclined sealing member engaging surface of said tip is defined by a conical upstream end of said tip.

9. The quick disconnect nozzle assembly of claim 6 in which said annular sealing member has a substantially circular cross section.

10. A quick disconnect nozzle assembly comprising a nozzle body, a spray nozzle tip, said tip and body each having an internal bore for the axial passage of fluid therethrough, an annular, non-metallic, resilient sealing and pressure exerting member interposed between said tip and body, said nozzle tip and body having cooperating camming means for causing said tip and body to be axially drawn together in response to rotation of said tip relative to said body for pressing said tip and body into predetermined sealing engagement with said annular sealing member, said tip and body having sealing member engaging surfaces for exerting compressive forces on said annular sealing member in three different directions for simultaneously compressing said sealing member both axially and radially in response axial drawing together of said tip and body, said tip and body member having engageable means for limiting rotational movement of said tip relative to said body and hence axial drawing movement of said tip relative to said body for establishing a fixed relationship between said tip and body sealing member engaging surfaces and a predetermined compressive loading between said sealing member and said tip and body sealing member engaging surfaces, and said tip and body each having integrally formed cooperating means for retaining said tip and body in axially drawn together fixed relationship without separate auxiliary fastening means.

11. The quick disconnect nozzle assembly of claim 10 in which said tip and body sealing member engaging surfaces are inclined at an acute angle to the axis of said bores for exerting compressive axial and radial forces on said annular sealing member.

12. The quick disconnect nozzle assembly of claim 11 in which one of said tip and body is formed with a chamber having a wall parallel to the axis of said bores for exerting radial compressive forces on said annular sealing member.

13. The quick disconnect nozzle assembly of claim 11 in which said inclined sealing member engaging surfaces of said tip and body are disposed at an angle of between 15° and 75° to the axis of said bores.

14. The quick disconnect nozzle assembly of claim 13 in which said sealing member engaging surfaces of said tip and body are disposed at an angle of about 45° to the axes of said bores.

15. The quick disconnect nozzle assembly of claim 11 in which said tip has an upstream end formed with said inclined sealing member engaging surface disposed at an angle of between 15° and 75° to the axis of said tip bore, and said body is formed with said inclined annular member seal engaging surface disposed at an angle of between 15° and 75° to the axis of said body bore for engaging a side of said annular sealing member opposite that engaged by said tip inclined surface.

16. The quick disconnect nozzle assembly of claim 11 in which said body inclined seal engaging surface is defined by outwardly and rearwardly extending annular groove in said body, said sealing member being compressed within said groove when said tip and body are in sealing engagement with said sealing member.

17. The quick disconnect nozzle assembly of claim 16 in which said annular sealing member is disposed within said body groove with an inner periphery of the annular sealing member disposed outwardly of said body bore.

18. The quick disconnect nozzle assembly of claim 16 in which said inclined sealing member engaging surface of said tip is defined by a conical upstream end of said tip.

19. The quick disconnect nozzle assembly of claim 10 in which said annular sealing member has a substantially circular cross section.

20. The quick disconnect nozzle assembly of claim 10 in which tip and body each are formed with said inclined sealing member engaging surfaces disposed at an acute angle to the axis of said bores for exerting compressive axial and radial forces on said annular sealing member.

21. The quick disconnect nozzle assembly of claim 11 in which one of said tip and body is formed with a chamber having a wall parallel to the axis of said bores for exerting radial compressive forces on said annular sealing member.

22. The quick disconnect nozzle assembly of claim 11 in which said inclined sealing member engaging surfaces of said tip and body each are disposed at an angle of between 15° and 75° to the axis of said bores.

23. The quick disconnect nozzle assembly of claim 11 in which said inclined sealing member engaging surfaces of said tip and body define an outwardly opening V within which said sealing member is disposed.

24. The quick disconnect nozzle assembly of claim 20 in which one of said tip and body define a cylindrical sealing member engaging surface, and said inclined sealing member engaging surfaces engage opposite sides of said sealing member and urge said sealing member radially outwardly into engaging relation with said cylindrical surface.

25. The quick disconnect nozzle assembly of claim 20 in which said inclined sealing member engaging surfaces of said tip and body define an outwardly opening V within which said sealing member is disposed.

26. The quick disconnect nozzle assembly of claim 25 in which one of said tip and body define a cylindrical sealing member engaging surface, and said inclined sealing member engaging surfaces engage opposite sides of said sealing member and urge said sealing member radially outwardly into engaging relation with said cylindrical surface.

27. A quick disconnect nozzle assembly comprising
a nozzle body,
a spray nozzle tip,
said tip and body each having an internal bore for the axial passage of fluid therethrough,
an annular, non-metallic, sealing and pressure exerting member interposed between said tip and body,
said nozzle tip and body having cooperating camming means for causing said tip and body to be axially drawn together in response to rotation of said tip relative to said body for pressing said tip and body into predetermined sealing engagement with said annular sealing member,
said tip and body having seal member engaging surfaces for simultaneously exerting compressive forces on said annular sealing member in both axial and radial directions in response to axial drawing together of said tip and body,
said tip and body member having engageable means for limiting rotational movement of said tip relative to said body and hence axial drawing movement of said tip into said body for establishing a fixed relationship between said tip and body sealing member engaging surfaces and a predetermined compressive loading on said sealing member and said tip and body sealing member engaging surfaces, and
said tip and body each having integrally formed cooperating means for retaining said tip and body in axially drawn together fixed relationship without separate auxiliary fastening means.

28. A quick disconnect nozzle assembly comprising
a nozzle body member,
a removable spray tip member,
said body and tip members being formed with bores for the passage of fluid therethrough,
one of said members being formed with an internal chamber and the other of said members having an end portion positioned into said chamber,
a first annular sealing member disposed within said chamber in interposed relation between said tip and body members for establishing a first seal therebetween,
a second annular sealing member disposed about said other member for effecting a second seal between said tip and body members,
said first and second seals creating a sealed chamber area between said members isolated from fluid passing through said fluid passageway bores, and
said tip and body members having cooperating camming means in said sealed chamber area for causing said tip and body members to be drawn axially together in response to rotational movement of said tip member relative to said body member for pressing said tip and body members into predetermined sealing engagement with said first annular sealing member.

29. The quick disconnect nozzle assembly of claim 26 in which said tip and body members have cooperating radial detent means within said sealed chamber area that are actuatable in response to rotation of said tip member relative to said body member for retaining said tip member in sealing engagement with said first annular sealing member without effecting the force of engagement of said tip member and body members on said annular sealing member.

30. The quick disconnect nozzle assembly of claim 28 in which said chamber is formed in a downstream end of said body member, and said end portion is an upstream end portion of said tip member.

31. The quick disconnect nozzle assembly of claim 28 in which said camming means includes camming lugs on one of said tip and body members and camming lug receiving slots in the other of said tip and body member, and said detent means includes detent lugs on one of said tip and body members and pairs of arcuate detent receiving surfaces on the other of said tip and body members, said pairs of arcuate surfaces each defining a detent lug receiving groove for retaining said tip and body members in sealing engagement with said first annular sealing member.

32. The quick disconnect nozzle assembly of claim 28 in which said annular sealing members have substantially circular cross sections.

33. The quick disconnect nozzle assembly of claim 28 in which said annular sealing members are "O" rings.

34. A quick disconnect nozzle assembly comprising
a nozzle body,
a spray nozzle tip,
an annular sealing member interposed between said tip and body,
said nozzle tip and body having cooperating camming means for causing said tip and body to be axially drawn together in response to rotation of said tip relative to said body for pressing said tip and body into predetermined sealing engagement with said annular sealing member, said camming means including camming lugs on one of said tip and body and camming lug receiving slots in the other of said tip and body,
said nozzle tip and body having radially cooperating detent means actuatable in response to rotation of said tip relative to said body for retaining said tip in sealing engagement with said annular sealing member without affecting the force of engagement of said spray tip and body on said annular sealing member, said detent means including detent lugs on one of said tip and body and pairs of arcuate surfaces on the other of said tip and body, said pairs of arcuate surfaces each defining a detent lug receiving groove for receiving one of said detent lugs and retaining said tip and body in sealing engagement with said annular sealing member, and one of said arcuate surfaces of each said pair being defined by a flexible wall adapted to permit passage of said detent lugs and the other of said arcuate surfaces of each pair being relatively rigid and adapted for preventing passage of said detent lugs.

35. The quick disconnect nozzle assembly of claim 34 in which said camming slots each are formed with an end wall for limiting rotational movement of said tip relative to said body and for limiting the forces by which said tip and body engage said annular sealing member.

36. The quick disconnect nozzle assembly of claim 35 in which said detent lugs and camming lugs are formed on said tip, and said camming lug receiving slots and said arcuate surfaces are formed in said body.

37. The quick disconnect nozzle assembly of claim 36 in which said body is formed with a chamber for receiving an upstream end portion of said tip, and said detent lugs and camming lugs extend radially outwardly of said upstream tip portion, and said camming slots and arcuate detent surfaces are formed within said body chamber.

38. A quick disconnect nozzle assembly comprising a nozzle body member, a removable spray tip member, said body and tip members being formed with bores for the passage of fluid therethrough, one of said members being formed with an internal chamber and the other of said members having an end portion positioned into said chamber, a first annular sealing member disposed within said chamber in interposed relation between said tip and body members for establishing a first seal therebetween, a second annular sealing member disposed about said end portion for effecting a second seal between said tip and body members, said first and second seals creating a sealed chamber area between said members isolated from fluid passing through said fluid passageway bores, said tip and body members having cooperating camming means in said sealed chamber area for causing said tip and body members to be drawn axially together in response to rotational movement of said tip member relative to said body member for pressing said tip and body members into predetermined sealing engagement with said first annular sealing member, and said tip member being formed with an annular outer peripheral flange upon which said second sealing member is mounted in a stretched condition, said body member having a forward annular end positioned about an upstream end portion of said tip member portion, and said flange having an outwardly and forwardly tapered ramp upon which said second sealing member is mounted for causing said second sealing member to be drawn into sealing engagement with said forward annular end of said body under the stretching force of said second annular sealing member.

39. The quick disconnect nozzle assembly of claim 38 in which said ramp has an outwardly extending lip at the bottom thereof for retaining said second sealing member on said tip member flange upon removal of said tip member from said body member.

* * * * *